US006645376B2

(12) United States Patent         (10) Patent No.:     US 6,645,376 B2
     Marioni                      (45) Date of Patent:     Nov. 11, 2003

(54) TUBE CONNECTION ASSEMBLY WITH SAFETY LOCKING SYSTEM FOR EXTERNAL FILTERS FOR AQUARIUMS

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 10/184,950

(22) Filed: Jul. 1, 2002

(65) Prior Publication Data

US 2003/0015464 A1 Jan. 23, 2003

(30) Foreign Application Priority Data

Jul. 17, 2001 (IT) ...................................... PD2001A0179

(51) Int. Cl.[7] ........................ A01K 63/04; B01D 35/157
(52) U.S. Cl. .................... 210/169; 210/235; 210/416.2; 210/429; 210/444; 210/460; 119/259
(58) Field of Search ................................ 210/169, 235, 210/416.2, 418, 429, 435, 443, 444, 459, 460; 119/259

(56) References Cited

U.S. PATENT DOCUMENTS 4,529,515 A    7/1985   Selz
4,559,136 A *  12/1985  Dockery ...................... 210/169
5,294,335 A *  3/1994   Chiang ........................ 210/169

FOREIGN PATENT DOCUMENTS

EP    0 619 070    10/1994
WO    01 83078     11/2001

* cited by examiner

Primary Examiner—Fred G. Prince
(74) Attorney, Agent, or Firm—Akerman Senterfitt

(57) ABSTRACT

A tube connection assembly for external filters for aquariums comprising a container that is closed by an upper lid and contains at least one filtering mass crossed by a water stream that is forced by a pump incorporated in the lid; two valves with flow control elements, which are arranged coaxially and are coupled to each other, a lever-type regulator protruding from a central region of the flow control elements; a lever-type engagement system articulated to the assembly between the regulator and the lid, acting on the same plane as the regulator, and having a wing for engaging the lid for extraction and a wing that allows the release movement by its insertion in a coverable seat that is provided between the flow control elements and is accessible to the wing only when the regulator is in the position that causes the simultaneous closure of the streams.

9 Claims, 4 Drawing Sheets

TUBE CONNECTION ASSEMBLY WITH SAFETY LOCKING SYSTEM FOR EXTERNAL FILTERS FOR AQUARIUMS

BACKGROUND OF THE INVENTION

The present invention relates to a tube connection assembly with safety locking system for external filters for aquariums.

It is known that the water contained in an aquarium must be appropriately oxygenated and filtered so that it can ensure optimum living conditions for aquatic animals.

One existing kind of filter is the external filter, which is usually constituted by a container inside which there is filtering material, through which the water stream from the aquarium passes so that the filtering material retains the suspended dirt.

In order to filter the water of the aquarium, the water is in fact circulated through a closed circuit of tubes to which the filter is arranged in series and under a head.

The head required to circulate the water inside the filter is ensured by an appropriately provided pump, which is normally electric with a permanent magnet rotor and is housed in the lid of the container.

Nowadays this kind of filter is widely tested in operation, but some problems arise during maintenance.

It is in fact well-known that the accumulation of dirt causes, over time, a gradual degradation of the functionality of the filter and therefore when this functionality drops below a certain minimum preset threshold the filtering material must be cleaned or removed appropriately.

Operation for removing the material normally entails disconnecting the filter from the tubes that connect it to the aquarium.

However, if the filter has been working normally up to the time when maintenance for removing the filtering material is performed, it is full of water and therefore in order to disengage the tubes from the filter it is necessary to close corresponding valves that control the flows and are placed on the tubes adjacent to the head.

This is done to avoid bothersome water losses.

However, since operation for disconnecting the filter is not particularly frequent, the user may be forgetful, consequently spilling water and causing inconveniences.

SUMMARY OF THE INVENTION

The aim of the present invention is to provide a tube connection assembly for external filters for aquariums that allows to disconnect the filter from the tubes for connection to the aquarium only when the valves are in the closed configuration.

Another object is to provide a connection assembly in which the flow-rate of liquid is adjusted by means of the same device that allows to disconnect the filter.

Within this aim, an object of the present invention is to provide a tube connection assembly for external filters for aquariums that allows simple and rapid filter maintenance.

Another object of the present invention is to provide a tube connection assembly for external filters for aquariums whose operations for disconnection from the filter do not require particular technical skills.

A further object of the present invention is to provide a tube connection assembly for external filters for aquariums whose structure can be produced at low cost with conventional equipment and systems.

This aim and these and other objects that will become better apparent hereinafter are achieved by a tube connection assembly for external filters for aquariums of the type that comprises a container that is closed hermetically by an upper lid and contains at least one filtering mass crossed by a water stream that is forced by means of a pump incorporated in said lid, said container being shaped so as to form, in the lid, parallel connectors, respectively for the input and output of the stream, in which said tube connection assembly engages, said tube connection assembly supporting the ends of tubes for connection to an aquarium, said tube connection assembly being characterized in that it comprises two valves with cylindrical flow control elements, which are arranged coaxially and are rigidly coupled to each other, a lever-type regulator protruding from a central region of said flow control elements in order to move them simultaneously by rotating said regulator on a plane that is perpendicular to a common axis of rotation, a lever-type engagement system being articulated to said assembly between said regulator and said lid, acting on the same plane as said regulator, and having a wing for engaging said lid and a locking wing that allows the release movement by means of its insertion in a coverable seat that is present between said flow control elements and is accessible to said wing only when said lever-type regulator is in the position that causes the simultaneous closure of the valves.

BRIEF DESCRIPTION OF THE DRAWINGS

Further characteristics and advantages of the present invention will become better apparent from the following detailed description of an embodiment thereof, illustrated only by way of non-limitative example in the accompanying drawings, wherein.

DESCRIPTION OF THE PREFERRED EMBODIMENTS

Figures 1, 2:
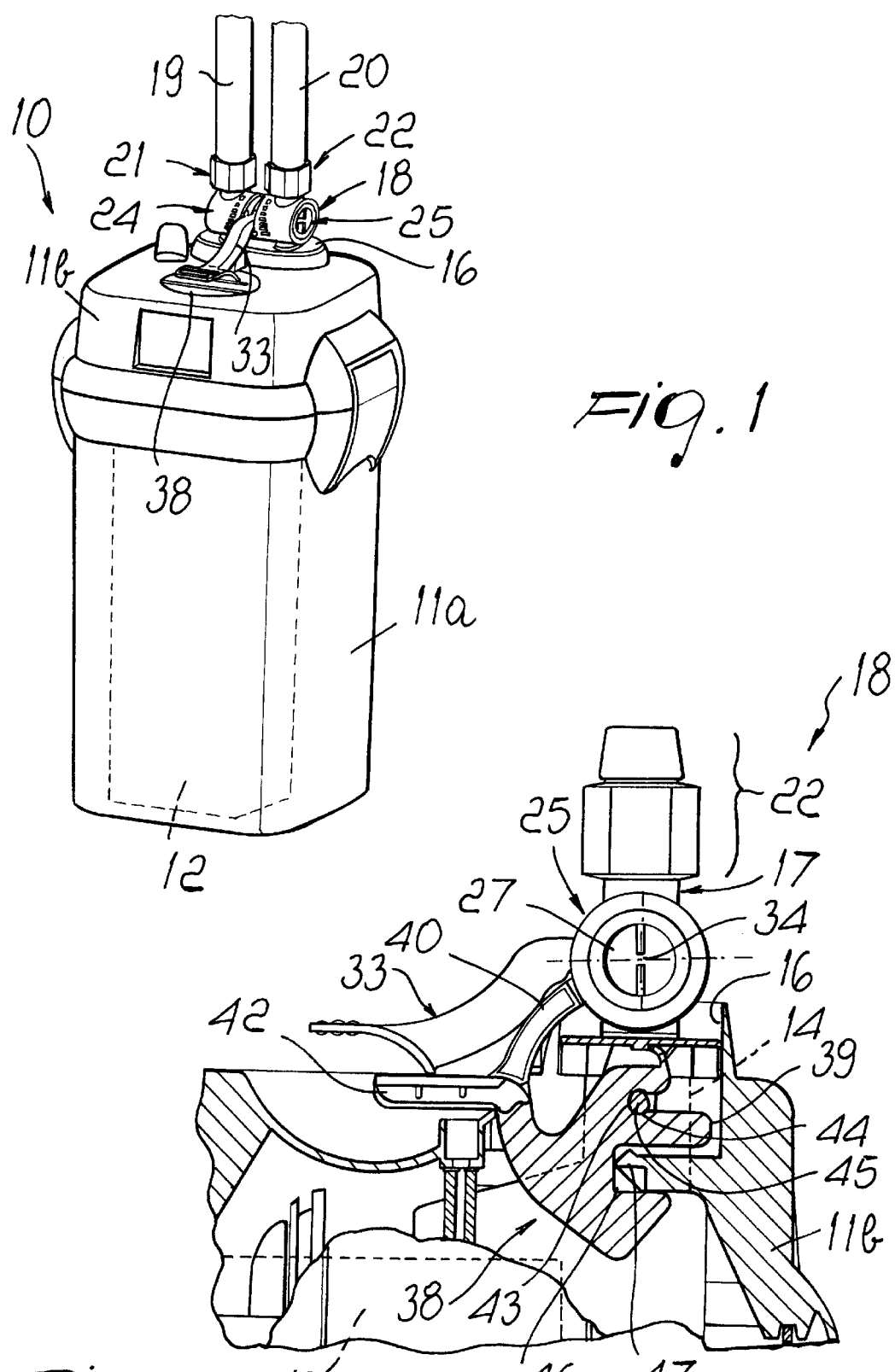
FIG. 1 is a perspective view of a filter provided with a tube connection assembly according to the present invention.
FIG. 2 is an enlarged-scale sectional view of a detail of the filter of FIG. 1.
Figure 3:
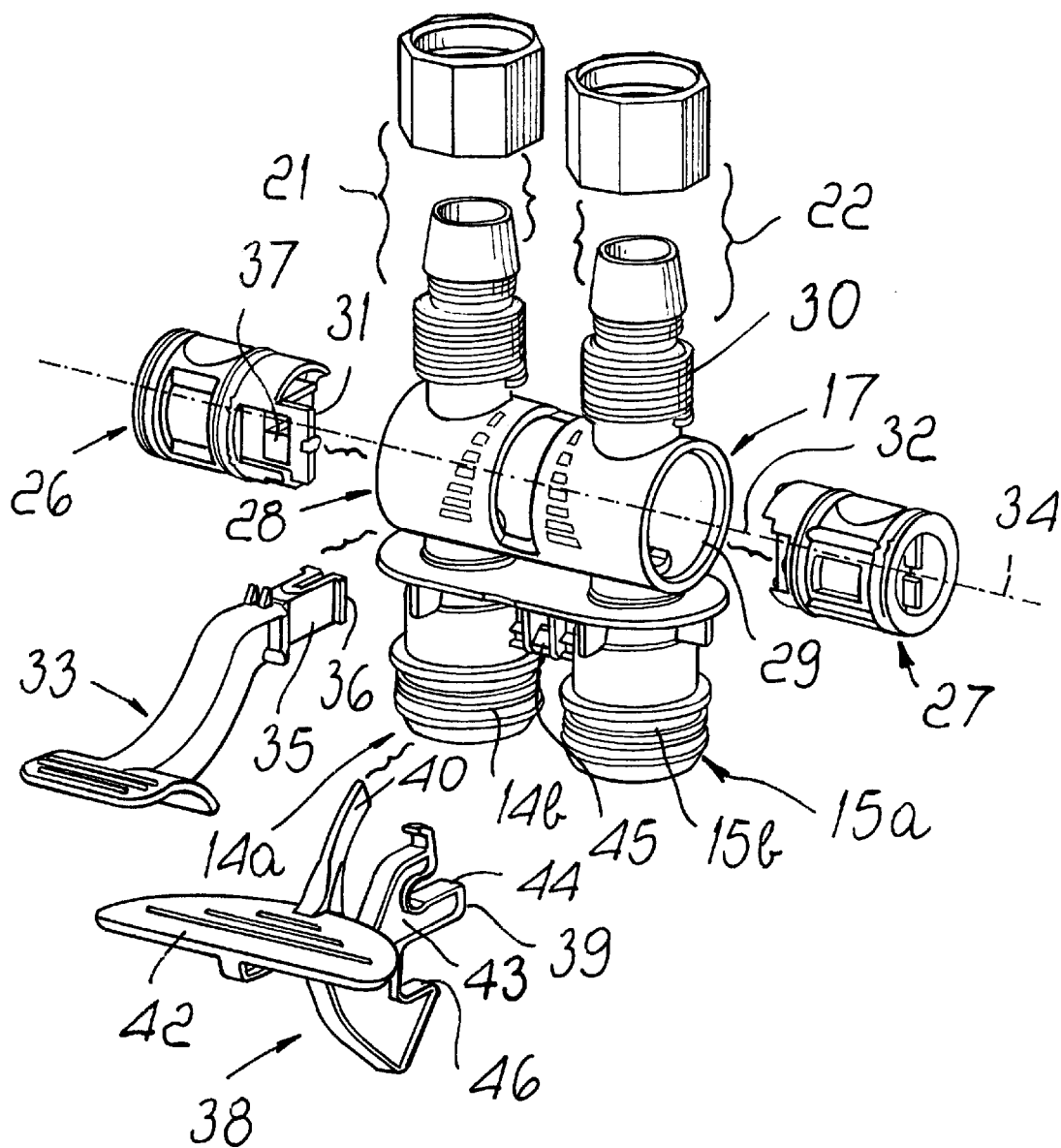
FIG. 3 is a perspective exploded view of the tube connection assembly according to the invention.
Figure 5:
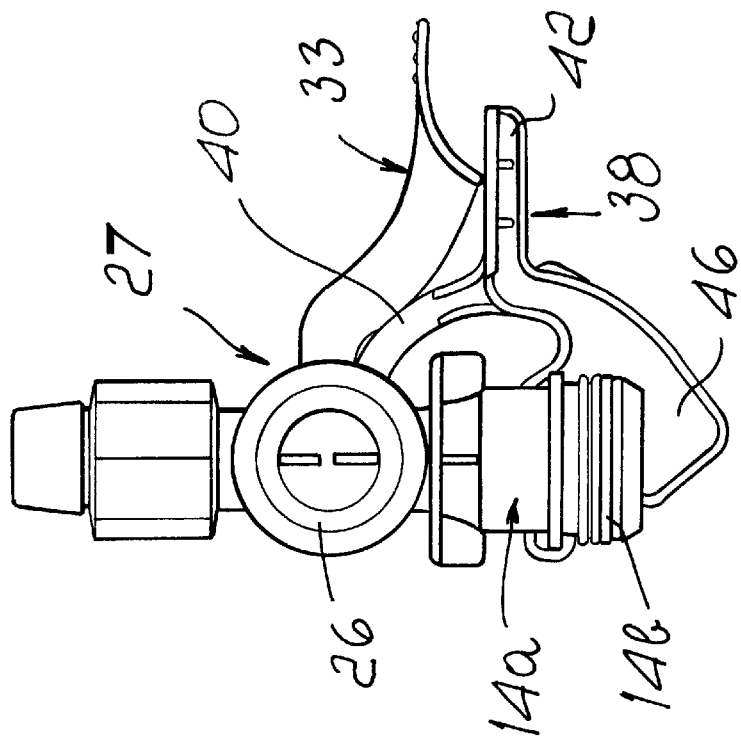
FIGS. 4 to 7 are various views of the tube connection assembly according to the invention.
Figure 4:
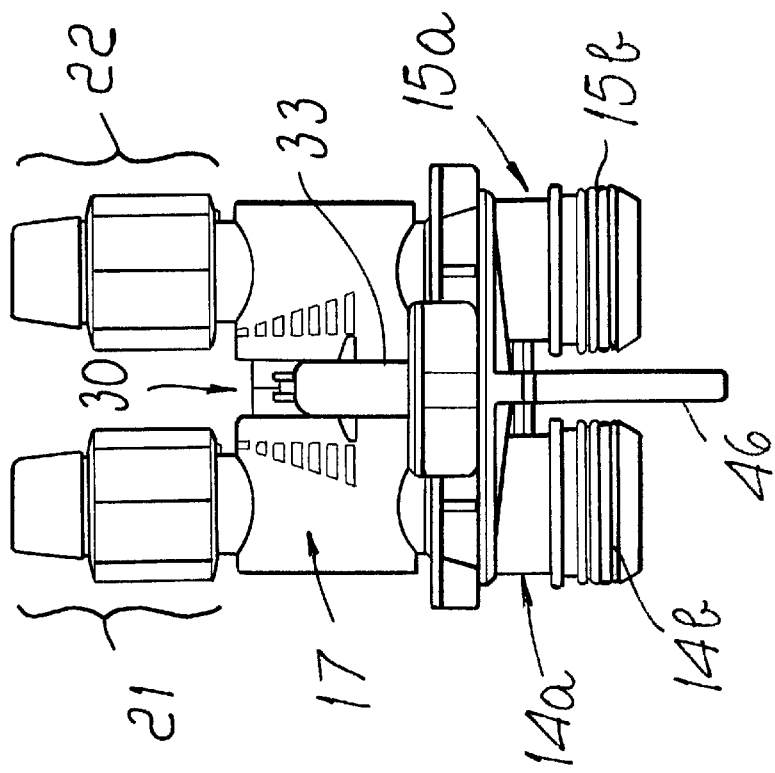
Figure 6:
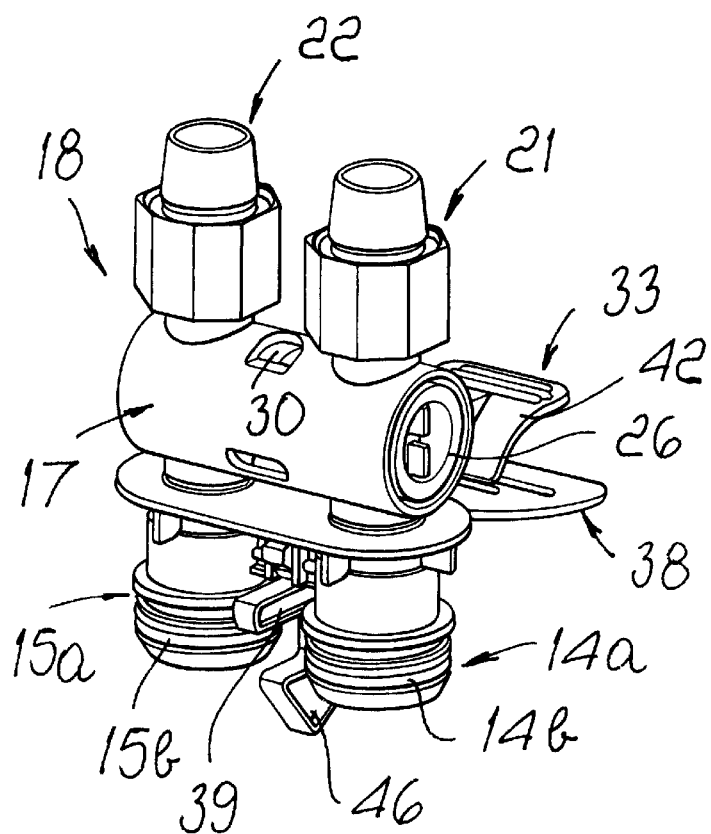

With reference to the figures, an external filter 10 for aquariums comprises a container 11a, which is closed hermetically by an upper lid 11b and contains at least one filtering mass 12 crossed by a water stream that is forced by means of a pump 13 built into the lid 11b.

The container 10 is shaped so as to form, in the lid 11b, parallel flow input and output connectors (only the connector designated by the reference numeral 14 being shown in dashed lines in the figures) formed in an appropriately provided seat 16, in which respective connectors 14a and 15a (conveniently provided with O-ring gaskets 14b and 15b) of the body 17 of a tube connection assembly 18 according to the invention are engaged.

The assembly 18 supports the ends of tubes 19 and 20, which are coupled onto corresponding unions 21 and 22 for connection to an aquarium (not shown for the sake of simplicity) and respective flow control valves 24 and 25.

In the tube connection assembly 18, the flow control elements 26 and 27 of the valves have a cylindrical profile, are arranged coaxially and are mutually rigidly coupled.

The flow control elements are in fact inserted in respective cylindrical seats 28 and 29 of the body 17, which are separated by a central region in which a semicircular slot 30 is provided, and have corresponding complementary interlocking ends 31 and 32 that meet in the region of the slot 30.

A lever-type regulator 33 protrudes from the region where said flow control elements 26 and 27 interlock, passing through the slot 30, for the simultaneous movement of the flow control elements by rotating the regulator on a plane that is perpendicular to the common axis of rotation 34.

The regulator 33, in particular, has an end 35 for coupling to the flow control elements 26 and 27 that is constituted by a fork with flexible prongs that end with hooks 36.

The end 35 is inserted (by deforming elastically) through the slot 30 in a through hole 37 formed between the flow control elements 26 and 27, and the hooks 36 are engaged against the edges of the end that lies opposite the insertion end.

A lever-type engagement system 38 is articulated to the assembly 18 between the regulator 33 and the lid 11b, acting on the same plane on which the regulator 33 moves, and has a cantilevered wing 39 for abutting against the lid 11b for the extraction of the assembly 18 and an opposite cantilevered locking wing 40 that allows the abutment movement (and therefore extraction) by entering a coverable seat 41, which is provided between the flow control elements 26 and 27 and can be accessed thereby only when the lever-type regulator 33 is in the configuration that simultaneously closes the flows.

In particular, the lever-type engagement system 38 comprises a shaped element 42 that can be operated by the user and is provided with the wing 39, with a portion 43 that forms a fork-like seat 44 for the interlocking and pivoting of a pivot 45 formed in the body 17, and with the locking wing 40, which protrudes toward the slot 30, which it can cross in order to enter the seat 41.

The lever-type engagement system 38 also has a hook-shaped portion 46, which ends with an internal protrusion 47 in the seat 16, fixing the body 18 to the lid 11b, by turning in the opposite direction with respect to the abutment and extraction direction, with the wing 40 in a configuration that does not interfere with the movements of the regulator 33.

The wing 40, with the lever-type engagement system 38 in the configuration for mutually coupling the shaped portion 46 and the protrusion 47, ends adjacent to the slot 30 but does not interfere with the movements of the regulator 33.

As regards operation, in the configuration for using the filter 10 the connectors 14a and 15a are inserted in the respective connectors 14 and 15 of the seat 16 of the lid 11b.

The lever-type engagement system 38 is in the configuration for engaging the hook-shaped portion 46 with the protrusion 47 and is angularly spaced from the regulator 33, with the wings 39 and 40 inactive.

In this condition, the regulator 33 can be turned in order to adjust the degree of opening of the valves 24 and 25 and therefore have a continuous adjustment of the flow-rate of liquid sent to filtration.

When it is necessary to separate the assembly 18 from the lid 11b it is necessary to turn the regulator 33 toward the maximum angular distance from the lever-type extractor 38; this position closes the valves 24 and 25 and uncovers the seat 41 in the slot 30.

Figure 7:
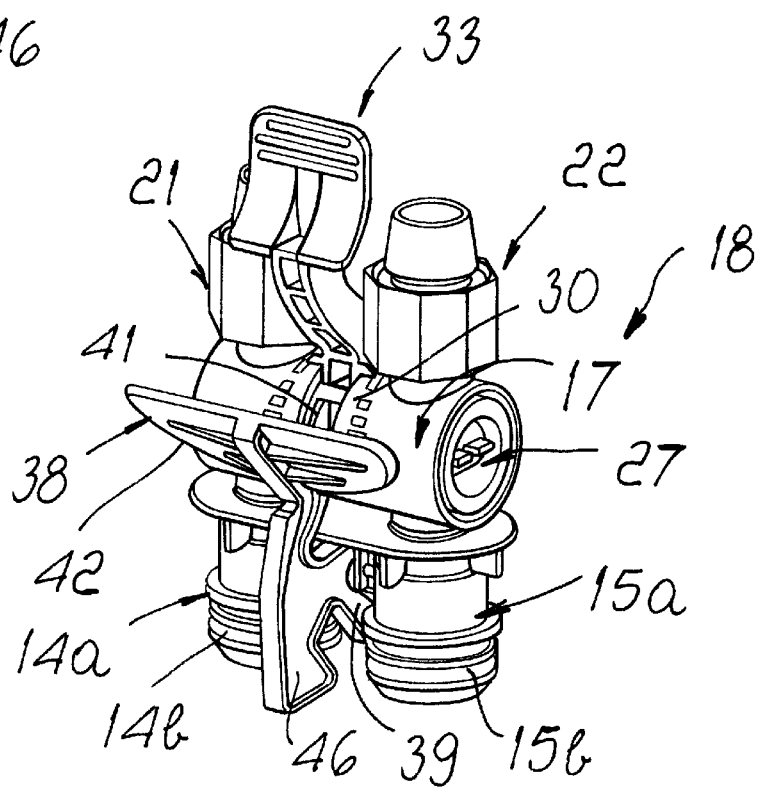

In this manner (FIG. 7), the lever-type engagement system 38 can be turned completely toward the regulator 33 (so that the wing 40 does not produce locking), causing the abutment of the wing 39 against the lid 11b (in particular the protrusion 47) and the extraction of the connectors 14a and 15a from the connectors 14 and 15.

In all the other mutual positions of the regulator 33 and of the lever-type engagement system 38 no extraction is possible, because the wing 40 cannot encounter and enter the seat 41 and this makes it impossible to disengage the is shaped portion 46 from the protrusion 47.

In practice it has been observed that the present invention has achieved the intended aim and objects.

The tube connection assembly for external filters for aquariums in fact allows to disconnect the filter from the tubes for connection to the aquarium only when the valves are in the closed configuration and with particularly simple and forced operations.

The same assembly also provides simultaneous adjustment of the flow-rate of the two valves.

Moreover, the tube connection assembly allows simple and rapid filter maintenance.

The present invention is susceptible of modifications and variations, all of which are within the scope of the appended claims.

The technical details can be replaced with other technically equivalent elements.

The materials and the dimensions may be any according to requirements.

The disclosures in Italian Patent Application No. PD2001A000179 from which this application claims priority are incorporated herein by reference.

What is claimed is:

1. A tube connection assembly for external filters for aquariums, of the type comprising a container that is closed hermetically by an upper lid and contains at least one filtering mass crossed by a water stream that is forced by means of a pump incorporated in said lid, said container being shaped so as to form, in the lid, parallel connectors, respectively for the input and output of the stream, in which said tube connection assembly engages, said tube connection assembly supporting the ends of tubes for connection to an aquarium, said tube connection assembly comprising two valves with cylindrical flow control elements, which are arranged coaxially and are rigidly coupled to each other, a lever-type regulator protruding from a central region of said flow control elements in order to move them simultaneously by rotating the regulator on a plane that is perpendicular to the common axis of rotation, a lever-type engagement system being articulated to said assembly between said regulator and said lid, acting on a same plane as said regulator, and having a wing for engaging said lid and a locking wing that allows the release movement by means of its insertion in a coverable seat that is present between said flow control elements and is accessible to said wing only when said lever-type regulator is in the position that causes the simultaneous closure of the valves.

2. The assembly according to claim 1, wherein said flow control elements are inserted in respective cylindrical seats of the body of said assembly, which are separated by a central region in which a semicircular slot is provided, and have corresponding complementary interlocking ends directed toward the region of said slot.

3. The assembly according to claim 1, wherein said lever-type regulator protrudes from the region of mutual interlocking of said flow control elements, passing through said slot in order to move said elements simultaneously by means of rotations of said regulator on a plane that is perpendicular to the common axis of rotation.

4. The assembly according to claim 3, wherein the end of said regulator designed for coupling to said flow control elements is constituted by a fork with flexible prongs that end with hooks, said end being inserted by flexing through said slot into a through hole formed between said flow control elements, said hooks engaging against the edges of the end that lies opposite the insertion end.

5. The assembly according to claim 1, wherein said lever-type engagement system is articulated to said assembly between said regulator and the region of engagement with said lid, acting on the same plane as said regulator.

6. The assembly according to claim 1, wherein said lever-type engagement system has a hook-like shaped portion that engages a protrusion of said lid, fixing said body to said lid, said engagement being determined by rotations in a direction that determines the greatest angular distance with respect to said regulator.

7. The assembly according to claim 1, wherein said lever-type engagement system has a cantilevered wing for abutting against said lid in order to extract said assembly, said wing being arranged opposite said locking wing and allowing the abutment movement and therefore extraction by means of its insertion in said coverable seat provided between said flow control elements.

8. An external filter for aquariums, comprising an engagement seat for a valve assembly according to claim 1.

9. The external filter for aquariums according to claim 8, wherein in said seat an engagement protrusion is provided for said hook-shaped portion of said lever-type engagement system.

* * * * *